United States Patent [19]
Hon et al.

[11] 4,019,159
[45] Apr. 19, 1977

[54] OPTICAL FREQUENCY DOUBLER USING ELECTRO-OPTIC CRYSTAL WITH IMPROVED FEEDBACK CONTROL OF CRYSTAL PHASE MATCH

[75] Inventors: David T. Hon, Los Angeles; Richard W. Wyeth, Agoura, both of Calif.

[73] Assignee: Hughes Aircraft Company, Culver City, Calif.

[22] Filed: Oct. 14, 1975

[21] Appl. No.: 621,883

[52] U.S. Cl. ............................ 332/7.51; 350/160 R; 331/94.5 M
[51] Int. Cl.[2] ...................... H01S 3/13; H04B 9/00
[58] Field of Search ............ 332/7.51; 331/94.5 M, 331/94.5 S; 250/199, 206; 350/150, 159, 160

[56] References Cited
UNITED STATES PATENTS

| | | | |
|---|---|---|---|
| 3,675,022 | 7/1972 | Nelson et al. | 250/199 |
| 3,793,595 | 2/1974 | Russo et al. | 331/94.5 S |
| 3,858,056 | 12/1974 | Melamed et al. | 331/94.5 S |
| 3,898,583 | 8/1975 | Shuey | 331/94.5 S |
| 3,928,822 | 12/1975 | Chenoweth et al. | 332/7.51 |
| 3,944,811 | 3/1976 | Midwinter | 250/199 |

OTHER PUBLICATIONS

Chenoweth et al., "High Data Rate Modulator", 2/73, pp. 1–8, 13–16, Tech. Report AFAL-TR-72-427.
Brand, "Optical Modulator System," 10/72, pp. 11, 19–22, Final Report, NAS 5-11474.
Ross, "Optical Communications in Space," 10/74, pp. 374–382, Optical Engineering, vol. 13, No. 5.

*Primary Examiner*—Nelson Moskowitz
*Attorney, Agent, or Firm*—Paul M. Coble; W. H. MacAllister

[57] ABSTRACT

An optical frequency doubling arrangement is disclosed in which the indices of refraction of light in a frequency doubling electro-optic crystal are controlled by both electric field pulses applied across the crystal and heater control pulses for controlling the temperature of an oven in which the crystal is mounted. Both the electric field pulses and the heater control pulses have a duty cycle determined by the detected optical power output from the crystal at the desired double frequency, the heater control pulses being responsive to the measured oven temperature as well. The arrangement is especially suitable for doubling the frequency of 1.06 μm laser beams.

9 Claims, 42 Drawing Figures

OPTICAL FREQUENCY DOUBLER USING ELECTRO-OPTIC CRYSTAL WITH IMPROVED FEEDBACK CONTROL OF CRYSTAL PHASE MATCH

This invention relates generally to optical parametric oscillators, and more particularly relates to a feedback control arrangement for providing a unique combination of temperature control and electric field tuning for a frequency doubling crystal to maintain the crystal in a condition providing maximum frequency doubling efficiency.

Optical frequency doubling can be achieved by passing a laser beam through a crystal of a material which develops laser beam components at harmonic frequencies of the frequency of the input beam. Maximum conversion of energy to the double frequency (second harmonic) beam occurs when light propagates through the crystal with a phase velocity at the fundamental frequency equal to the phase velocity at the second harmonic frequency. This phase-match condition is achieved when the crystal has an index of refraction for light at the fundamental frequency equal to the index of refraction for light at the second harmonic frequency.

Two key parameters affecting the crystal indices of refraction (and hence the frequency doubling efficiency) are the physical alignment of the crystal with the incoming radiation and the temperature of the crystal. A slight change in either of these parameters can reduce to a considerable extent the amplitude of the double frequency output. While maintaining the crystal in the proper alignment has been a relatively simple matter, maintaining the temperature of the crystal at the critical value for which the desired phase match occurs has posed a severe problem in the art.

Ovens have been employed to heat the crystal to the desired phase-match temperature. However, as the laser beam traverses the crystal, sufficient heating of the crystal occurs to destroy the phase-match condition. Although the oven temperature can be controlled in response to a measured temperature, the thermal time constants inherent in direct oven temperature control servos are too slow to be practical. Therefore, a common practice in the industry has been to preset the oven temperature a few degrees below the desired phase-match temperature and allow the crystal heating due to interaction with the laser beam to raise the crystal temperature to substantially the hase-match temperature. However, such preset oven temperature arrangements require substantial start-up times before the crystal reaches the desired operating temperature, and in addition, they do not provide continuous control over the double frequency output amplitude.

Since the indices of refraction of a frequency doubling crystal are also affected by electric fields, control of the phase-match condition can be achieved by applying a biasing electric field to the crystal. In fact, feedback control systems have been developed in which the biasing electric field for frequency doubling crystal is automatically adjusted in such a manner as to compensate for changes in the monitored double frequency output form the crystal and maintain the crystal indices of refraction at the desired phase-match condition. One such electro-optic feedback control arangement is disclosed in Soffer et al. U.S. Pat. No. 3,524,147, issued Aug. 11, 1970, and entitled "Method and Apparatus for the Electro-Optic Control and Modulation of Light." Although electric field applying feedback control arangements have been successful in stabilizing the output from frequency doubling crystals for certain input power levels, these arrangements are unable to provide the desired stabilization as the input power level is increased.

Accordingly, it is an object of the present invention to provide an arrangement for stabilizing the double frequency output power from an optical frequency doubling crystal at higher input power levels than heretofore has been achieved.

It is a further object of the invention to provide a feedback control arrangement for an optical frequency doubling crystal which rapidly and accurately maintains the desired phase-match condition in the frequency doubling crystal over a wider range of temperatures than has been achieved with the prior art.

It is a still further object of the invention to provide an optical frequency doubling arrangement which maintains maximum frequency doubling conversion efficiency for a longer period of time than has been achieved in the past.

An arrangement according to the invention includes a crystal of electro-optic material mounted in an oven and positioned to receive an input beam of light at a predetermined frequency. The crystal is oriented to convert the input light beam into an output light beam having a component at twice the frequency of the input beam. A feedback control arrangement responsive to both the magnitude of the double frequency component and to the temperature within the oven controls the indices of refraction of light in the crystal to provide maximum conversion of light to the double frequency component. This is accomplished by controlling a heater element for the oven in addition to applying an appropriate electric field across the crystal.

Additional objects, advantages and characteristic features of the present invention will become apparent from the following detailed description of a preferred embodiment of the invention when considered in conjunction with the accompanying drawings wherein:

FIGS. 3a–3s are graphs of respective timing waveforms showing signals at various points in the diagram of FIG. 1 for the temperature condition of FIG. 2a;

FIGS. 4a–4s are graphs of respective timing waveforms showing signals at the same various points in the diagram of FIG. 1 but for the temperature condition depicted in FIG. 2b.

Figure 1:
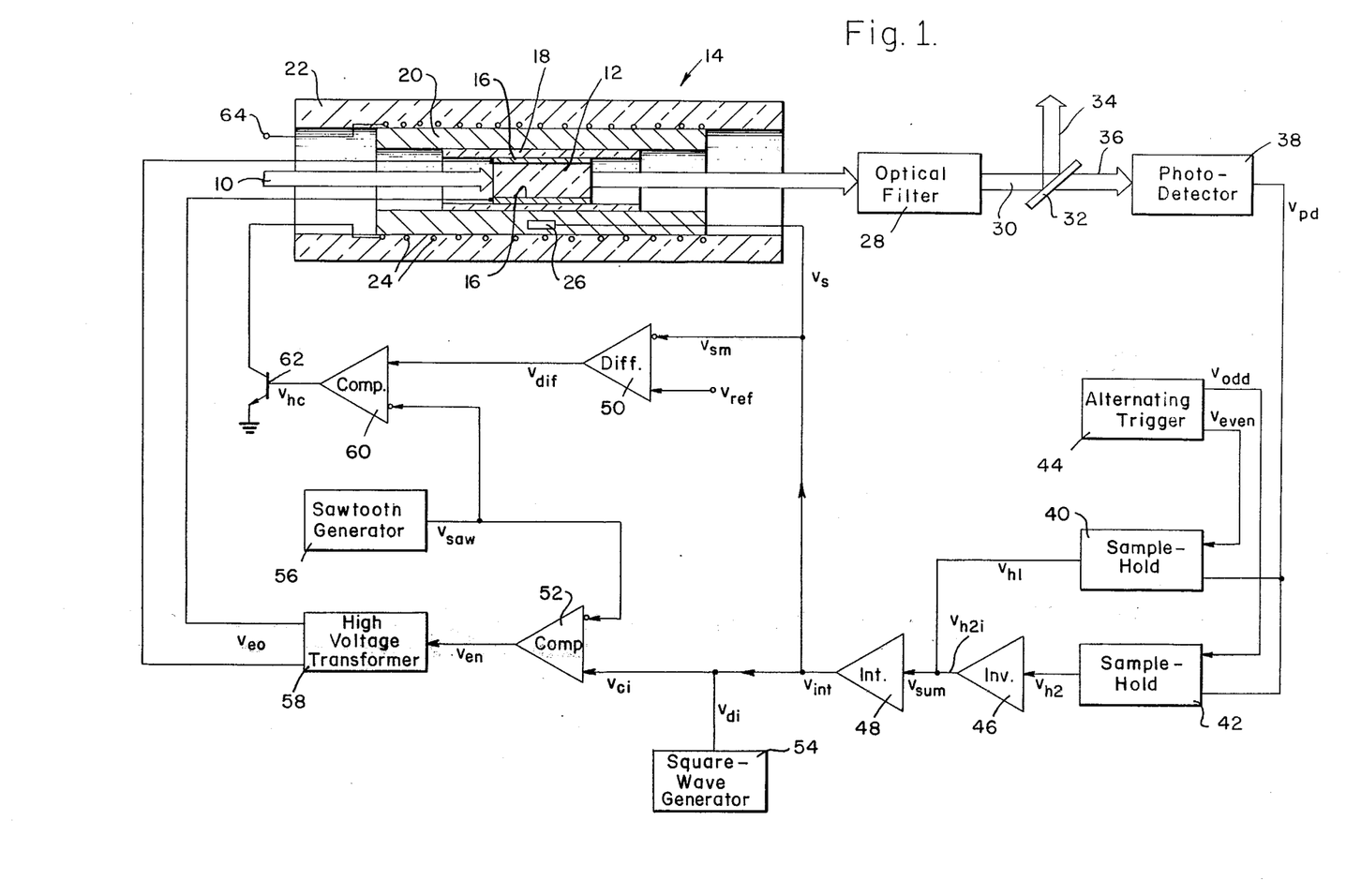
FIG. 1 is a schematic diagram, primarily in block form, illustrating an optical frequency doubling arrangement in accordance with the invention.

Referring to FIG. 1 with greater particularity, an input light beam 10, the frequency of which is to be doubled, is shown incident upon a frequency doubling crystal 12 of electro-optic material. As an illustrative example, the light beam 10 may be a pulsed laser beam generated by a neodymium laser and having a wavelength of 1.06 $\mu$m, although it should be understood that light beams of other wavelengths and generated by other means are also suitable. In a preferred embodiment of the invention the electro-optic crystal 12 is of deuterated cesium dihydrogen arsenate (CD*A), although other electro-optic materials such as lithium niobate, barium sodium niobate and KDP or any of their isomorphs may be employed instead.

For maximum conversion of light to the second harmonic frequency the crystal 12 should be properly oriented with respect to the input light beam 10. As a specific example, when the crystal 12 is of CD*A and the light beam 10 has a wavelength of 1.06 μm, the $x$ and $y$ axes of the crystal should be disposed at an angle of 45° with respect to the direction of propagation of the beam 10, with the input beam polarized in the $xy$ plane at an angle of 45° with respect to the $x$ and $y$ axes.

In addition to proper crystal alignment, maximum conversion efficiency requires that the crystal 12 be maintained at the proper phase-match temperature. For this purpose, the crystal 12 is housed in an oven 14 which is heated to a temperature in the vicinity of the desired phasematch temperature, and fine tuning to the desired phasematch condition is achieved by the novel feedback control arrangement of the invention which not only applies appropriate electric field pulses across the crystal 12 but also simultaneously controls the duty cycle of a heater for the oven 14, as will be explained more fully below. As an illustrative example, for an electro-optic crystal 12 of CD*A used in conjunction with 1.06 μm radiation, the desired phase-match temperature would lie essentially in the range 50°–100° C depending upon the degree of deuteration (98° C being the appropriate phase-match temperature for 80% deuteration).

As shown in FIG. 1, electro-optic crystal 12 is provided with a pair of electrodes 16 on its opposing broad faces in order to apply an electric field across the crystal 12. The crystal 12 is supported within an electrically insulating block 18, of ceramic for example, which in turn is mounted within a supporting member 20 of a material having good thermal conductivity, for example, brass. Support member 20 is mounted within an oven housing 22 of electrically insulating material such as in-place foam, with a heater coil 24 disposed within the housing 22 and wound about the support member 20. Each of the members 18, 20 and 22 is open at both ends to permit the passage of light beam 10 directly through crystal 12. A temperature sensor 26 is mounted within support member 20 near the crystal 12 to provide an indication of the temperature with the oven 14 adjacent to the crystal 12.

After emerging from the crystal 12, light beam 10 is passed through an optical filter 28 having a passband encompassing the second harmonic frequency of the input beam fundamental frequency but sufficiently narrow to reject the fundamental frequency and higher order harmonic frequencies. As a specific example, for the aforementioned 1.06 μm input laser beam, the filter 28 would have a passband centered at 0.53 μm and cutoff wavelengths above 0.265 μm and below 1.06 μm.

Light beam 30 emerging from the filter 28 is incident upon a beamsplitter 32 which divides the beam 30 into a frequency doubled output beam 34 and a sample beam 36 which is used in developing feedback control signals to control the indices of refraction of the crystal 12. Sample beam 36 is incident upon a photodetector 38, for example a silicon photodiode, which provides an electrical output voltage $v_{pd}$ having an amplitude proportional to the amplitude of the light beam 36. Since in a preferred embodiment of the invention light beam 10 is pulsed, the output from photodetector 38 consists of a series of voltage pulses.

The photodetector output voltage $v_{pd}$ is applied to a pair of sample and hold circuits 40 and 42, respectively, which when activated, provide respective dc output voltages of a magnitude proportional to the amplitude of the input pulse applied to the circuit 40 or 42. The respective sample and hold circuits 40 and 42 are activated on alternate half cycles, designated $v_{even}$ and $v_{odd}$, respectively, of a square-wave voltage generated by an aternating trigger generator 44. The alternating trigger generator 44 is synchronized with the laser used to produce the light pulses of the beam 10 so that the frequency of each of the square-wave voltages $v_{even}$ and $v_{odd}$ is half the laser pulse repetition frequency, and each sampled voltage pulse $v_{pd}$ commences approximately midway along each half cycle of the voltages $v_{even}$ and $v_{odd}$. Thus, sample and hold circuit 40 provides an output voltage $v_{h1}$ which assumes a dc level proportional to the amplitude of the voltage pulses $v_{pd}$ sampled on even square-wave half cycles; and similarly, sample and hold circuit 42 provides an output voltage $v_{h2}$ which assumes a dc level proportional to the amplitude of the voltage pulses $v_{pd}$ on odd square-wave half cycles.

The voltage $v_{h2}$ from sample and hold circuit 42 is inverted by inverter circuit 46 to produce inverted voltage $v_{h2i}$. Inverted voltage $v_{h2i}$ is combined with the output voltage $v_{h1}$ from sample and hold circuit 40 to produce a summation voltage $v_{sum}$ which is fed to an integrator 48. Integrator 48, which provides an output voltage $v_{int}$ proportional to the time integral of the voltage $v_{sum}$ contains a clamping circuit at its output to prevent the voltage $v_{int}$ from ever going negative.

The voltage $v_{int}$ is applied to an inverting input to a differential amplifier 50 as well as to a non-inverting input to a comparator circuit 52. Also applied to the same noninverting input to comparator 52 is a dither voltage $v_{dt}$ generated by a square-wave generator 54. The function of the dither voltage $v_{dt}$ will be explained more fully below; however, for the present it should suffice to state that the dither voltage $v_{dt}$ is employed to provide a rapid indication of the direction of any deviation of the crystal indices of refraction away from the desired phase-match condition. In a preferred embodiment of the invention the dither voltage $v_{dt}$ is synchronized with one of the alternating trigger voltages such as $v_{odd}$, and although a separate square-wave generator 54 and alternating trigger generator 44 are shown for purposes of illustration, it should be apparent that a single generator circuit could be employed to produce the voltages $v_{even}$, $v_{odd}$ and $v_{dt}$.

The composite voltage applied to the non-inverting input to comparator 52 is termed $v_{ct}$ and consists of the sum of the dither voltage $v_{dt}$ and the integrator output voltage $v_{int}$. An inverting input to comparator 52 receives a sawtooth voltage $v_{saw}$ generated by a sawtooth generator 56. The frequency of the sawtooth voltage $v_{saw}$ is substantially higher than that of the dither voltage $v_{dt}$. As specific illustrative example, for a laser pulse repetition frequency of 10 pulses per second and a dither voltage $v_{dt}$ of 5 Hz, the sawtooth voltage $v_{saw}$ may have a frequency of 50 KHz. The comparator 52 provides an output voltage in the form of an enabling pulse $v_{en}$ of predetermined constant amplitude when the voltage $v_{ci}$ exceeds the sawtooth voltage $v_{saw}$ and provides zero output at all other times.

The enabling voltage $v_{en}$ is applied to a high voltage transformer 58, the output from which is connected between the crystal electrodes 16. The high voltage transformer 58 provides an output voltage $v_{eo}$ in the form of pulses synchronized in time with pulses of the light beam 10 (for example by applying a trigger signal to the transformer 58 coincident in time with the laser excitation pulses) and having an amplitude proportional to the stored energy in the transformer 58. Since the energy stored in transformer 58 is a function of the duty cycle of the enabling pulses $v_{en}$, the pulses $v_{eo}$ applied to the electrodes 16 are of an amplitude determined by the duty cycle of the enabling pulses $v_{en}$, the larger the duty cycle, the greater the pulse amplitude. The pulses $v_{eo}$ generate an electric field across the crystal 12 to compensate for deviations of the crystal indices of refraction from the desired phase-match condition.

In addition to the aforementioned electric field compensation, the duty cycle of energizing current to the heater coil 24 for the oven 14 is varied in a manner to compensate for deviations in the crystal 12 from the desired phase-match condition. A dc reference voltage $v_{ref}$ of a magnitude proportional to the desired oven temperature is applied to a non-inverting input to differential amplifier 50. The temperature within the oven 14 near the crystal 12 is sensed by temperature sensor 26 which produces a voltage $v_s$ inversely proportional to the sensed temperature. The sensor output voltage $v_s$ is combined with the voltage $v_{int}$ from the integrator 48 to produce a voltage $v_{sm}$ which is applied to the inverting input to differential amplifier 50.

Differential amplifier 50 provides an output voltage $v_{dif}$ equal to the difference between the reference voltage $v_{ref}$ and the voltage $v_{sm}$. The voltage $v_{dif}$ is applied to a non-inverting input to a comparator circuit 60, an inverting input to which receives the sawtooth voltage $v_{saw}$ from the sawtooth generator 56. The comparator circuit 60 provides a heater control voltage $v_{hc}$ at a predetermined positive level when the voltage $v_{dif}$ exceeds the voltage $v_{saw}$ and provides zero output at all other times. Thus, the heater control voltage $v_{hc}$ consists of a series of pulses, the duty cycle of which is determined by the differential amplifier output voltage $v_{dif}$.

The heater control voltage $v_{hc}$ is applied to the control terminal of an electronic switch illustrated as a transistor 62 connected in series with the oven heater coil 24. The switch 62 and the coil 24 are connected across a suitable power supply having a terminal 64 supplying an operating voltage (for example, +28 volts) for the heater. When the switch 62 is conductive, heater current $i_h$ flows through the coil 24 causing the oven 14 to generate heat for the crystal 12. Since the switch 62 is triggered into conduction by the heater control voltage $v_{hc}$, the heater current $i_h$ takes the form of a series of pulses corresponding to the heater control voltage pulses $v_{hc}$ and hence having a duty cycle determined by the differential amplifier output voltage $v_{dif}$.

The operation of the arrangement of FIG. 1 will now be described with reference to the output power versus temperature graphs of FIGS. 2a and 2b and the timing waveforms of FIGS. 3a–3s and 4a–4s. The frequency doubled output power $P_{out}$ from the crystal 12 as a function of temperature is shown by the curve 70 of FIGS. 2a and 2b. It may be seen that the output power $P_{out}$ is a maximum at the phase-match temperature $T_o$ for which the crystal 12 has an index of refraction for light at the fundamental frequency equal to the index of refraction for light at the second harmonic frequency. Assume that the crystal 14 is at a temperture $T_1$ slightly below the phase-match temperature $T_o$, a condition illustrated by point 72 on curve 70 of FIG. 2a. As was mentioned above, in order to determine whether the crystal temperature is above or below the phase-match temperature $T_o$, a pulsed electric field controlled by the dither voltage $v_{di}$ is applied across the crystal 12. This effectively causes the operating point on the curve 70 to oscillate as shown by arrows 74 between operating point 72 and a new operating point 76 corresponding to a slightly lower temperature. Since the magnitude of the frequency doubled output power $P_{out}$ is less at operating point 75 than it is at operating point 72, the output pulses $v_{pd}$ from photodetector 38, shown in FIG. 3a, alternate between larger amplitude pulses 80 (corresponding to operating point 72) and smaller amplitude pulses 82 (corresponding to operating point 76).

Figure 3A:
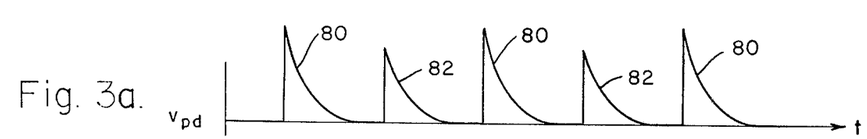
Figure 3B:
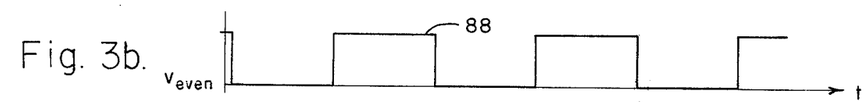
Figure 3C:
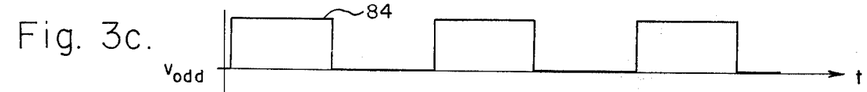
Figure 3D:
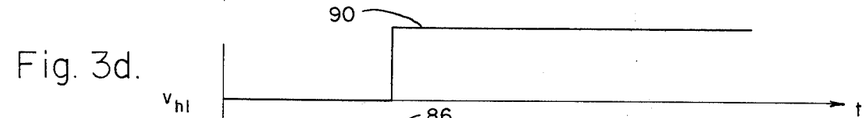
Figure 3E:
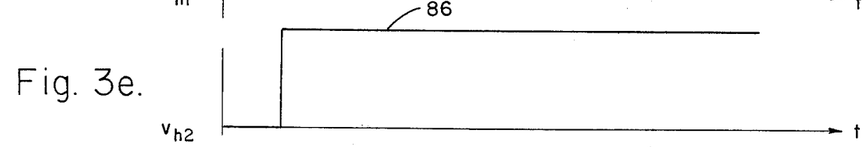
Figure 3F:
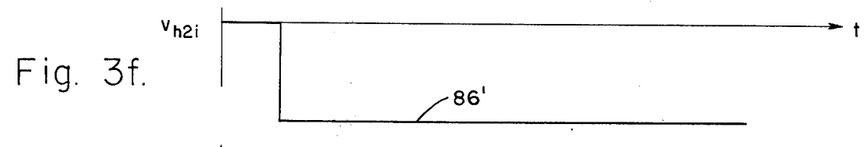
Figure 3G:
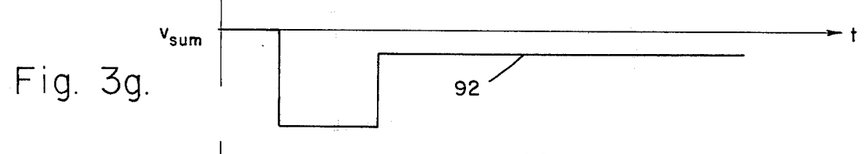
Figure 3H:
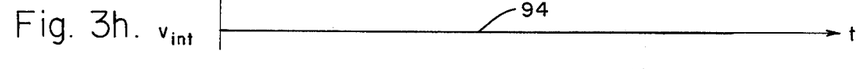

The photodetector output pulses 80 are sampled by the alternating trigger voltage $v_{odd}$, illustrated by waveform 84 of FIG. 3c, causing the sample and hold circuit 42 to provide a dc output voltage $v_{h2}$ (FIG. 3e) at a level 86 proportional to the amplitude of the pulses 80. Similarly, photodetector output pulses 82 are sampled by the alternating trigger voltage $v_{even}$, shown by waveform 88 of FIG. 3b, causing the sample and hold circuit 40 to provide a dc output voltage $v_{h1}$ (FIG. 3d) at a level 90 proportional to the amplitude of the pulses 82. Inverter circuit 46 inverts the dc level 86 of the voltage $v_{h2}$ to the inverted level 86' of the voltage $v_{h2i}$ (FIG. 3f), and the voltages $v_{h1}$ and $v_{h2i}$ are combined to produce the voltage $v_{sum}$ illustrated by waveform 92 of FIG. 3g. The voltage $v_{sum}$ is integrated in integrator 48; however, since the integrator output is clamped so that it can never go negative, the integrator output voltae $v_{int}$ corresponding to integrator input waveform 92 remains zero, as illustrated by waveform 94 of FIG. 3h.

Figure 3I:
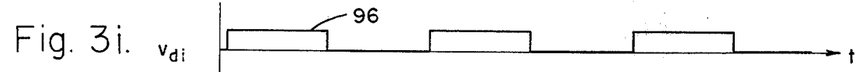
Figure 3J:
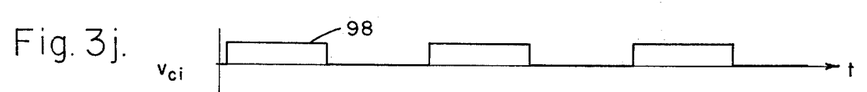
Figure 3K:
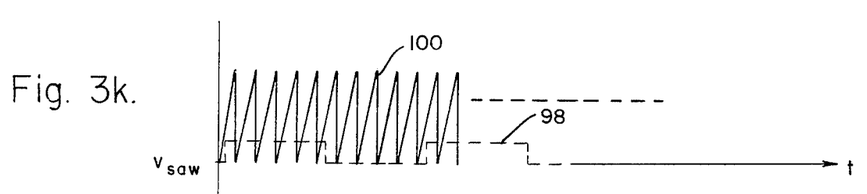
Figure 3L:
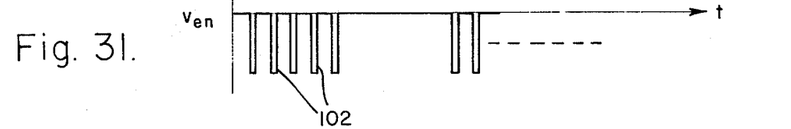

The dither voltage $v_{di}$ generated by square-wave generator 54 is illustrated by waveform 96 of FIG. 3i and, when combined with integrator ouġput voltage $v_{int}$, produces a comparator input voltage $v_{ci}$ (shown by waveform 98 of FIG. 3j) which is the same as the dither voltage $v_{di}$. The comparator 52 compares the voltage $v_{ci}$ (repeated in dashed line in FIG. 3k) with the sawtooth voltage $v_{saw}$ (illustrated by waveform 100 of FIG. 3k) and produces enabling voltage $v_{en}$ in the form of a series of pulses 102 (FIG. 3l) when the voltage $v_{ci}$ exceeds the instantaneous value of the sawtooth voltage $v_{saw}$. It may be seen from FIGS. 3k and 3l that groups of enabling pulses 102 are produced during positive half cycles of the voltage $v_{ci}$, while there is an absence of enabling pulses during the other half cycles of the voltage $v_{ci}$.

The enabling pulses 102 cause the high voltage transformer 58 to produce output pulses 104 (FIG. 3m) of an amplitude determined by the duty cycle of the pulses 102 and concurrent in time with the optical pulses of beam 10. The pulses 104 generate electric field pulses across the crystal 12 in such direction as to alter the crystal indices of refraction in the same way as that which would result from a reduction in crystal temperature (i.e., move the point of operation from point 72 to point 76 on the curve 70 of FIG. 2a).

With respect to control of the heater current to the coil 24, the reference voltage $v_{ref}$ is set at a level 106

(FIG. 3n) to maintain the crystal temperature at the phasematch temperature $T_o$. The temperature sensor 26 produces a voltage $v_s$ at a level 108 (FIG. 3o) corresponding to the crystal temperature at operating point 72 (the response of the sensor 26 is not fast enough to detect oscillatory changes to operating point 76). Since the integrator output voltage $v_{int}$ (FIG. 3h) is zero at this time, the combined voltage $v_{sm}$ applied to differential amplifier 50 resides at a level 110 (FIG. 3p) equal to the level 108 of the voltage $v_s$. The differential amplifier output voltage $v_{dif}$ resides at level 112 (FIG. 3q) equal to the difference between the voltage levels 106 and 110. The comparator 60 compares the voltage $v_{dif}$ with the sawtooth voltage $v_{saw}$ (repeated in dashed line in FIG. 3q) and produces heater control voltage $v_{hc}$ in the form of a series of pulses 114 (FIG. 3r) when the difference voltage level 112 exceeds the instantaneous value of the sawtooth voltage waveform 100.

Activation of the electronic switch 62 by the heater control pulses 114 enables current pulses 116 (FIG. 3s) to flow through heater coil 24 concurrently with the control pulses 114. Since the differential amplifier output voltage $v_{dif}$ remains at a constant level 112 over the time period shown in FIGS. 3a–3s, the current pulses 116 have a constant duty cycle over this time period. The net heater current is sufficient to cause the oven 14 to generate the proper amount of heat to subsequently raise the temperature of the crystal 12 to the phase-match temperature $T_o$.

Figure 2A:
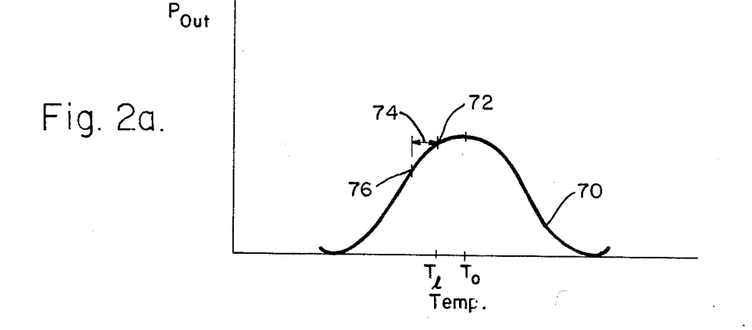
FIGS. 2a and 2b are graphs illustrating the output power as a function of temperature for a frequency doubling crystal in the arrangement of FIG. 1 as used in explaining the operation of the arrangement of FIG. 1 for two different temperature conditions.
Figure 2B:
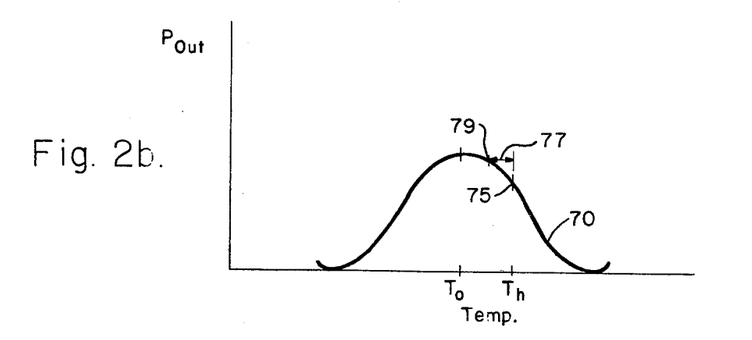

Now assume that the crystal 12 is at a temperature $T_h$ slightly above the phase-match temperature $T_o$, a condition depicted by operating point 75 on the output power versus temperature curve 70 of FIG. 2b. As was mentioned above, the dither voltage $v_{dt}$ causes electric field pulses to be applied across the crystal 12 in a direction having the same effect on the crystal indices of refraction as a reduction in crystal temperature. Thus, for the condition shown in FIG. 2b, the operating point on curve 70 is caused to oscillate as shown by arrows 77 between point 75 and a new operating point 79 closer to the phase-match temperature $T_o$.

As will be explained more fully below, for the condition illustrated in FIG. 2b, the magnitude of the electric field pulses applied across crystal 12 gradually increases, thereby causing the operating point on the curve 70 to move toward the phase-match temperature $T_o$. At the same time, the dither voltage $v_{dt}$ adds a further electric field component to these pulses. As a result, the photodetector output voltage $v_{pd}$ consists of a series of pulses 120a–120e having a component of gradually increasing amplitude and a further component of alternately increasing and decreasing amplitude (due to the dither voltage). Thus, the amplitude of pulse 120b is greater than that of pulse 120a due to both the dither voltage and the gradual change in the steady state operating point on curve 70; pulse 120c has an amplitude less than that of pulse 120b due to the absence of a dither pulse but greater than that of pulse 120a due to the change in the steady state operating point on curve 70, etc.

Figure 4A:
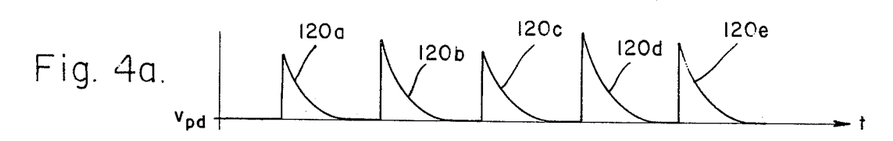
Figure 4B:
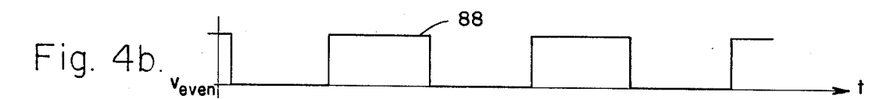
Figure 4C:
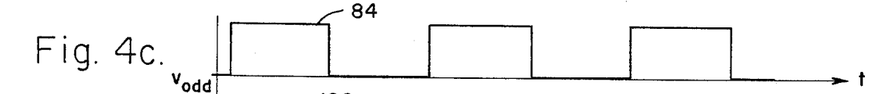

The alternating trigger voltages $v_{even}$ and $v_{odd}$ are the same as for the condition of FIG. 2a and hence are shown in FIGS. 4b and 4c by the respective waveforms 88 and 84 of FIGS. 3b and 3c, respectively. For the condition of FIG. 2b, the sample and hold circuit 40 produces a voltage $v_{h1}$ (FIG. 4d) having a waveform 122 in the form of a positive step coincident in time with pulse 120b to a level proportional to the amplitude of pulse 120b and a further step coincident with the next alternate pulse 120d and of a magnitude proportional to the difference between the amplitudes of the pulses of 120d and 120b. Similarly, sample and hold circuit 42 produces a voltage $v_{h2}$ (FIG. 4e) having a waveform 124 in the form of a step coincident in time with pulse 120a and of a magnitude proportional to the amplitude of pulse 120a, followed by subsequent steps coincident with respective pulses 120c and 120e and of respective amplitudes equal to the amplitude difference between the coincident pulse and the second previous pulse.

Figure 4D:
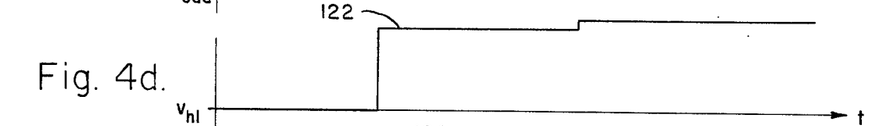
Figure 4E:
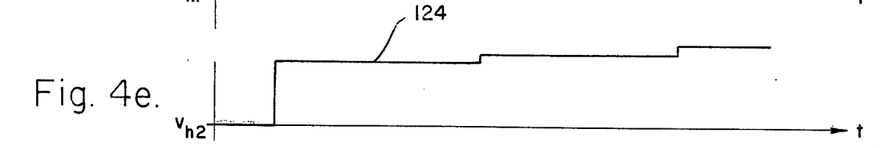
Figure 4F:
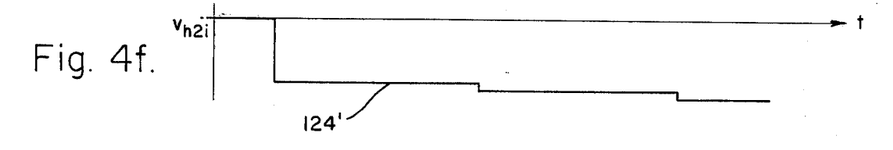
Figures 4G, 4H:
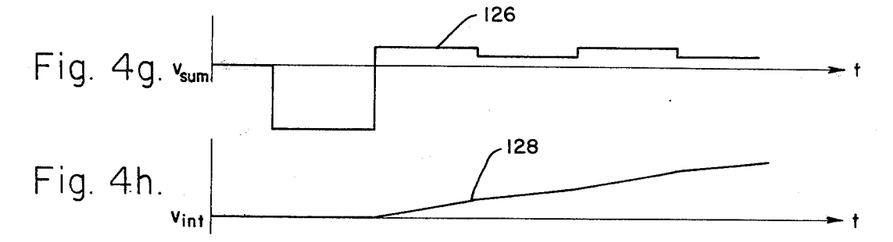
Figure 4I:
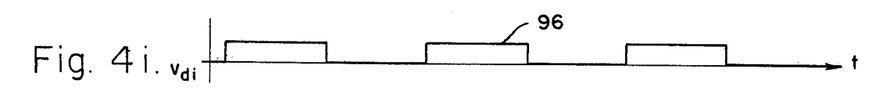
Figure 4J:
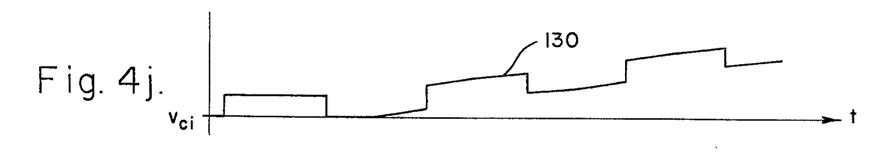

Inverter circuit 46 inverts waveform 124 to produce waveform 124' of FIG. 4f which is combined with waveform 122 of FIG. 4d to produce the voltage $v_{sum}$ having waveform 126 of FIG. 4g. Integrator 48 integrates the waveform 126 to produce the voltage $v_{int}$ illustrated by waveform 128 of FIG. 4h. It may be seen that once the voltage $v_{sum}$ has become positive, waveform 128 increases in ramp-like fashion with a rate of increase varying in accordance with the level of the voltage $v_{sum}$. The dither voltage $v_{dt}$ is the same as that for the condition of FIG. 2a and is shown in FIG. 4i by waveform 96 of FIG. 3i. The voltage $v_{ct}$, which is the sum of the voltages $v_{dt}$ and $v_{int}$, is illustrated by waveform 130 of FIG. 4j. It may be seen that as long as waveform 128 remains zero, $v_{ct}$ is equal to the dither voltage $v_{dt}$; however once waveform 128 begins to increase, waveform 130 increases accordingly.

Figure 4K:
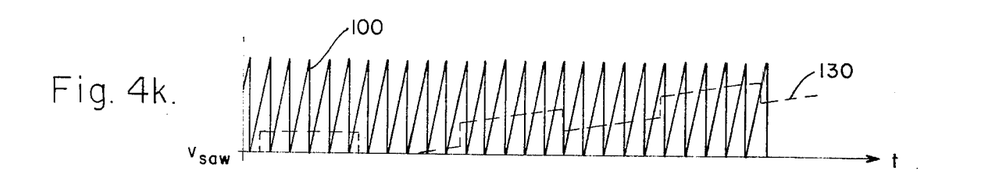
Figure 4L:
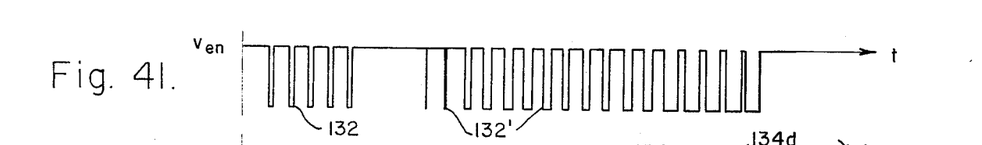

The sawtooth voltage $v_{saw}$ is shown by waveform 100 of FIG. 4k, and in order to better illustrate the development of the enabling voltage $v_{en}$, waveform 130 of the voltage $v_{ct}$ is repeated in dashed line in FIG. 4k. As was explained above, the comparator circuit 52 produces an enabling voltage $v_{en}$ when the voltage $v_{ct}$ exceeds the enstantaneous value of the sawtooth voltage $v_{saw}$ (i.e., when waveform 130 exceeds waveform 100). Thus, as illustrated in FIG. 4l, comparator 52 produces enabling voltages pulses 132 of constant duty cycle as long as the waveform 130 remains constant and non-zero, and produces enabling pulses 132' of generally increasing duty cycle (except for periodic reductions due to the dither component) as the value of waveform 130 increases.

Figure 4M:
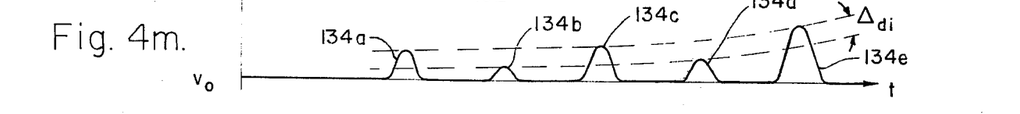

Since the high voltage transformer 58 produces a voltage $v_{eo}$ of an amplitude proportional to the energy input from the enabling voltage $v_{en}$, as the duty cycle of the enabling pulses 132, 132' increases, so does the amplitude of the voltage $v_{eo}$ provided by the transformer 58. Thus, as shown in FIG. 4m, transformer 58 provides a series of pulses 134a–134e having a component of gradually increasing amplitude due to the increasing amplitude of waveform 130 and a further component of constant amplitude occurring only on alternate $v_{eo}$ pulses due to the dither voltage $v_{dt}$, the dither component being designated $\Delta_{dt}$ in FIG. 4m. The pulses 134a–134e generate electric field pulses across the crystal 12 in such direction as to alter the crystal indices of refraction in the same way as that which would result from a reduction in crystal temperature (i.e., move the operating point on the curve 70 of FIG. 2b toward the point corresponding to the phase-match temperature $T_o$).

Figure 3Q:
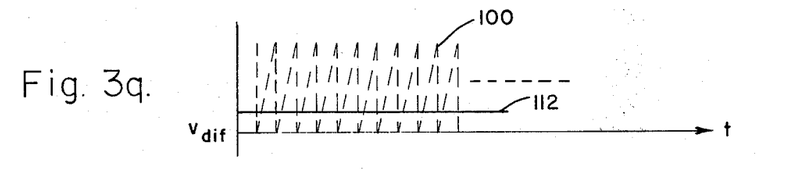
Figure 4N:
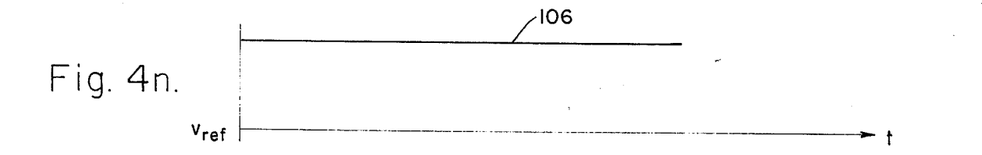
Figure 4O:
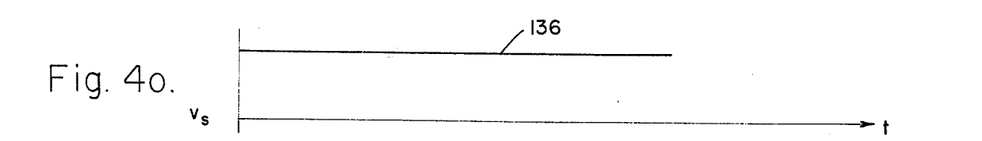
Figure 4P:
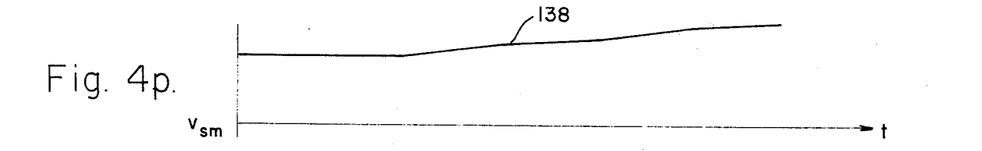

With respect to the oven temperature control for the condition illustrated in FIG. 2b, the reference voltage $v_{ref}$ (FIG. 4n) remains at the same level 106 as for the condition of FIG. 2a. The voltage $v_s$ from temperature sensor 26 is illustrated by level 136 of FIG. 4o. Combined input voltage $v_{sm}$ to differential amplifier 50 consists of the sum of waveforms 136 and 128 and is illustrated by waveform 138 of FIG. 4p. It may be seen that as long as the integrator voltage waveform 128 remains zero, waveform 138 remains at a constant level equal to the level 136; however, once the integrator output voltage waveform 128 commences to increase, waveform 138 increases correspondingly. The output voltage $v_{dif}$ from differential amplifier 50 is illustrated by waveform 140 of FIG. 4q. It may be seen that waveform 140 initially resides at a constant positive level (similar to waveform 112 of FIG. 3q); however, once waveform 138 commences to increase, waveform 140 decreases correspondingly, eventually becoming negative.

Figures 4Q, 4R:
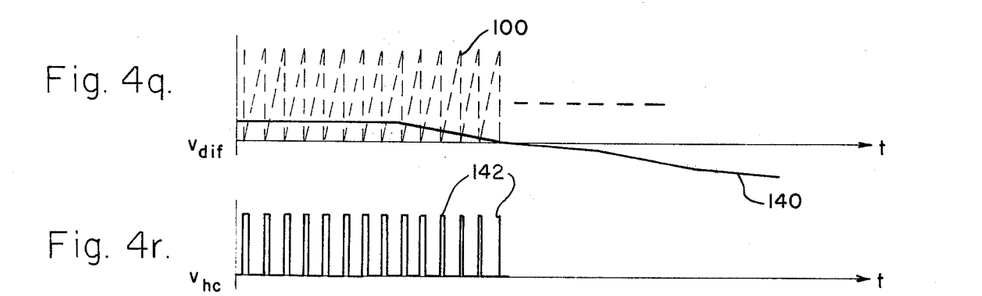

The comparator 60 provides a heater control voltage $v_{hc}$ when the differential amplifier output waveform 140 exceeds the instantaneous value of the sawtooth voltage $v_{saw}$, the sawtooth voltage waveform 100 being repeated in dashed line in FIG. 4q to better illustrate the development of the heater control voltage $v_{hc}$ which takes the form of a series of pulses 142 shown in FIG. 4r. It may be seen that as long as the waveform 140 of FIG. 4q remains constant, the heater control pulses 142 have a constant duty cycle. However, once the waveform 140 begins to decrease, the duration of the pulses 142 decreases correspondingly, and when the waveform 140 becomes negative, the pulses 142 cease altogether.

Figure 4S:
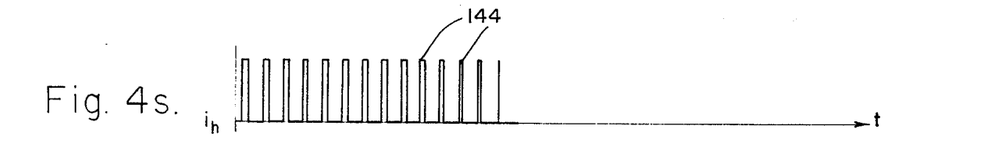

The heater current $i_h$ takes the form of pulses 144 (FIG. 4s) concurrent in time and duration with the heater control pulses 142. Thus, it may be seen that after a brief initial transient time, the heater current is stopped, thereby turning off the oven 14. This oven turnoff, along with the additive effect of the electric field pulses applied across the crystal 12, causes a reduction in the temperature of the crystal 12 toward the phase-match temperature $T_o$.

Figure 3M:
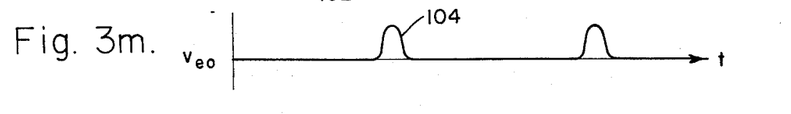
Figure 3N:
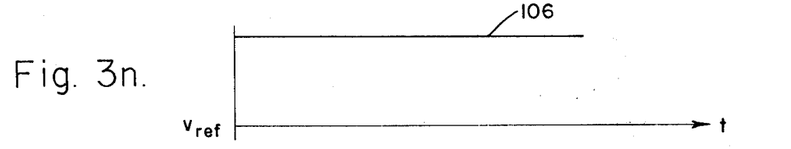
Figure 3O:
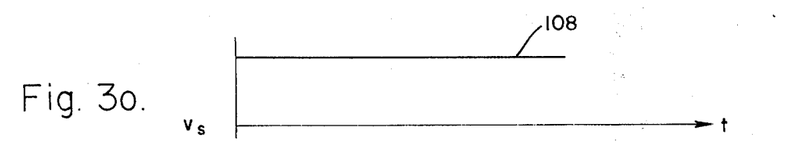
Figure 3P:
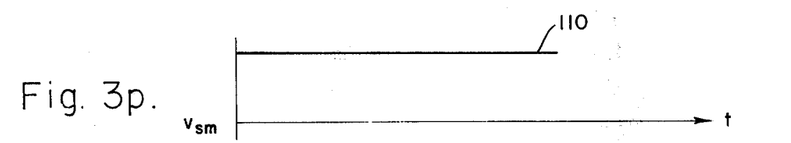
Figure 3R:
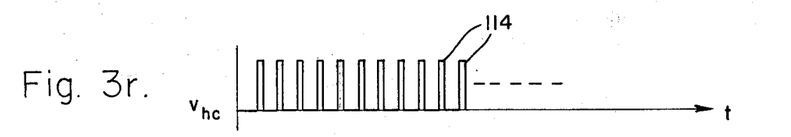
Figure 3S:
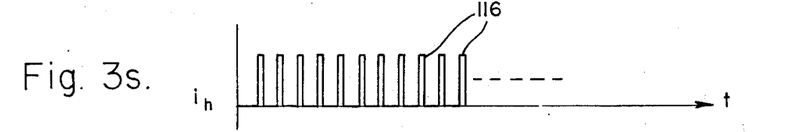

When the temperature of the crystal 12 is at the phase-match temperature $T_o$, the electric field pulses applied to the crystal 12 take the form of pulses 104 of FIG. 3m. These electric field pulses produce very little change in the amplitude of the photodetector output pulses $v_{pd}$ because the output power versus temperature curve 70 is relatively flat in the immediate vicinity of the temperature $T_o$. Thus, the output voltages $v_{h1}$ and $v_{h2}$ from the sample and hold circuits 40 and 42, respectively, reach substantially the same steady state levels, producing a voltage $v_{sum}$ having a substantially zero steady state level. The remaining voltages (and the heater current $i_h$) have the same waveforms as shown in FIGS. 3h–3s, respectively.

An arrangement according to the invention in which the indices of refraction of light in the electro-optic crystal 12 are controlled by both electric field tuning and oven temperature control, each in accordance with the duty cycle of pulses derived from the detected optical power output at the desired double frequency, is able to maintain maximum frequency doubling efficiency better than any known control arrangement according to the prior art.

Figure 5:
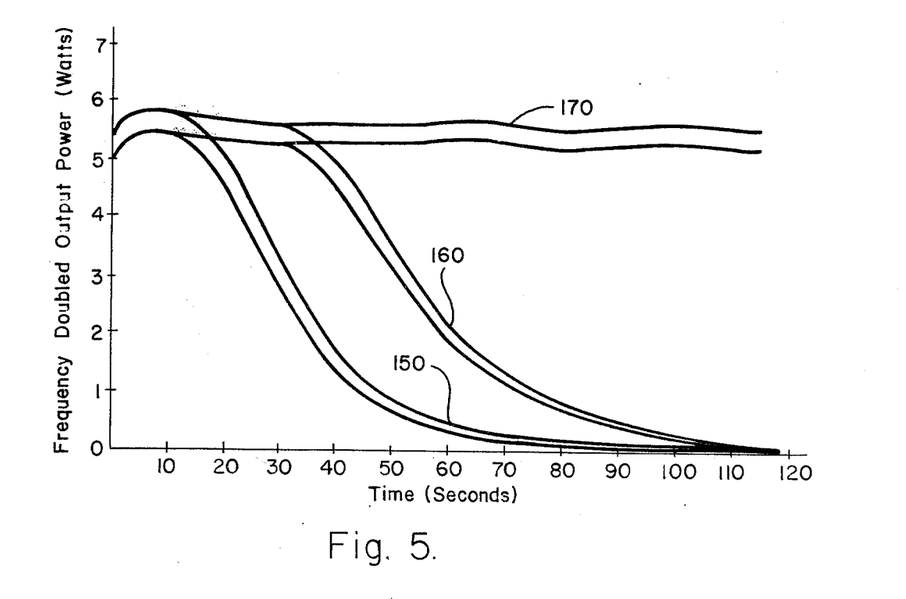
FIG. 5 is a graph illustrating the frequency doubled output power as a function of time achieved with the arrangement according to FIG. 1 as well as with other arrangements.

FIG. 5 illustrates the frequency doubled output power as a function of time after commencement of operation from a crystal 12 of CD*A in response to 10.4 watts of input power for an input light beam at a frequency of 1.06 μm under several different control conditions. The large width (double lines) of the various curves of FIG. 5 results from pulse-to-pulse variations in the output from the laser used to generate the 1.06 μm input beam. Curve 150 of FIG. 5 shows the frequency doubled output power in the absence of any feedback control arrangement. It may be seen from curve 150 that the frequency doubled output power begins to decrease rapidly after about 10 seconds and becomes very small after about 60 seconds. Curve 160 illustrates the frequency doubled output power from the same crystal with the same input but with a feedback control arrangement providing electric field compensation only (i.e., substantially according to FIG. 1 but without any oven temperature control). It may be seen from curve 160 that the frequency doubled output power remains substantially at its maximum value for over 30 seconds before beginning to decrease rapidly and becomes very small after about 100 seconds. Curve 170 shows the frequency doubled output power from the same crystal with the same input using a control arrangement according to FIG. 1 in its entirety. The frequency doubled power output may be seen to remain substantially constant at approximately its maximum value for the entire measurement time (approximately 2 minutes), a considerably longer period of time than has been achieved without the present invention.

Although the invention has been shown and described with reference to a particular embodiment, nevertheless various changes and modifications obvious to a person skilled in the art to which the invention pertains are deemed to lie within the spirit, scope and contemplation of the invention.

What is claimed is:

1. An optical frequency doubling arrangement comprising:
    an oven including a heater element;
    a crystal of electro-optic material mounted in said oven and positioned to receive an input beam of light at a predetermined frequency, said crystal being oriented to convert said input light beam into an output light beam having a component at twice said predetermined frequency; and
    feedback control means responsive to the magnitude of said component at twice said predetermined frequency and to the temperature within said oven for controlling the indices of refraction of light in said electro-optic crystal to provide maximum conversion of light to said component at twice said predetermined frequency, said feedback control means including:
    means for providing a first electrical signal indicative of the magnitude of said component at twice said fundamental frequency;
    means for deriving from said first electrical signal a second electrical signal indicative of a continuing change in the magnitude of said component at twice said fundamental frequency;
    means responsive to said second electrical signal for applying an electric field across said crystal of a magnitude determined by said second electrical signal;
    means for providing a third electrical signal indicative of the temperature within said oven; and
    means responsive to the sum of said second and third electrical signals for controlling said heater element.

2. An optical frequency doubling arrangement according to claim 1 wherein said electric field applying means includes:

means for generating a series of enabling pulses having a duty cycle determined by the magnitude of said second electrical signal; and means for generating electric field pulses of an amplitude determined by the duty cycle of said enabling pulses.

3. An optical frequency doubling arrangement according to claim 2 wherein said input beam of light consists of a series of optical pulses, and said electric field pulses occur concurrently in time with at least alternate ones of said optical pulses.

4. An optical frequency doubling arrangement according to claim 3 wherein said enabling pulse generating means includes means for generating a dither signal at a frequency equal to half the repetition frequency of said optical pulses.

5. An optical frequency doubling arrangement according to claim 4 wherein said enabling pulse generating means further includes means for generating a sawtooth signal at a frequency substantially higher than that of said dither signal, and comparator means for generating the said enabling pulse when the sum of said dither signal and said second electrical signal exceeds the instantaneous value of said sawtooth signal.

6. An optical frequency doubling arrangement according to claim 1 wherein said heater element includes an electrically conductive path, and said means for controlling said heater element includes:

means for generating a series of control pulses having a duty cycle determined by the sum of said second and third electrical signals; and means for causing electric current to flow through said path coincident in time with said control pulses.

7. An optical frequency doubling arrangement according to claim 6 wherein said control pulse generating means includes differential amplifier means for providing a difference signal representative of the difference between a reference signal indicative of the desired temperature of said crystal and a signal representative of the sum of said second and third electrical signals.

8. An optical frequency doubling arrangement according to claim 7 wherein said control pulse generating means further includes means for generating a sawtooth signal, and comparator means for generating the said control pulse when said difference signal exceeds the instantaneous value of said sawtooth signal.

9. An optical frequency doubling arrangement according to claim 1 wherein said electric field applying means includes means for generating a series of enabling pulses having a duty cycle determined by the magnitude of said second electrical signal and means for generating electric field pulses of an amplitude determined by the duty cycle of said enabling pulses, said heater element including an electrically conductive path, and said means for controlling said heater element including means for generating a series of control pulses having a duty cycle determined by the sum of said second and third electrical signals and means for causing electric current pulses to flow through said path coincident in time with said control pulses.

* * * * *

UNITED STATES PATENT OFFICE
CERTIFICATE OF CORRECTION

PATENT NO. : 4,019,159
DATED : April 19, 1977
INVENTOR(S) : David T. Hon; Richard W. Wyeth It is certified that error appears in the above-identified patent and that said Letters Patent are hereby corrected as shown below:

Column 1, line 49, "hase-match" should be --phase-match--

Column 1, line 63, "form" should be --from--

Column 4, line 13, "aternating" should be --alternating--

Column 6, line 17, "75" should be --76--

Column 8, line 36, "enstantaneous" should be -- instantaneous --

Column 9, line 4, after "integrator" insert -- output --.

Signed and Sealed this second Day of August 1977

[SEAL]

Attest:

RUTH C. MASON
Attesting Officer

C. MARSHALL DANN
Commissioner of Patents and Trademarks